United States Patent
Wakasugi et al.

(10) Patent No.: US 9,738,173 B2
(45) Date of Patent: Aug. 22, 2017

(54) CHARGING AND DISCHARGING CONTROL DEVICE, CHARGING AND DISCHARGING CONTROL METHOD, PROGRAM AND VEHICLE TRAFFIC SYSTEM

(71) Applicant: MITSUBISHI HEAVY INDUSTRIES, LTD., Tokyo (JP)

(72) Inventors: Kazuyuki Wakasugi, Tokyo (JP); Takayuki Kono, Tokyo (JP); Katsuaki Morita, Tokyo (JP); Toshihiko Niinomi, Tokyo (JP); Noritaka Yanai, Tokyo (JP); Kenji Takao, Tokyo (JP); Kyotaro Onishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 231 days.

(21) Appl. No.: 14/651,645

(22) PCT Filed: Sep. 27, 2013

(86) PCT No.: PCT/JP2013/076361
§ 371 (c)(1),
(2) Date: Jun. 11, 2015

(87) PCT Pub. No.: WO2014/097705
PCT Pub. Date: Jun. 26, 2014

(65) Prior Publication Data
US 2015/0314699 A1    Nov. 5, 2015

(30) Foreign Application Priority Data

Dec. 19, 2012 (JP) ................................ 2012-277158

(51) Int. Cl.
*B60L 11/18* (2006.01)
*B60L 7/14* (2006.01)
(Continued)

(52) U.S. Cl.
CPC ............. *B60L 11/1861* (2013.01); *B60L 7/14* (2013.01); *B60L 11/1816* (2013.01);
(Continued)

(58) Field of Classification Search
None
See application file for complete search history.

(56) References Cited

U.S. PATENT DOCUMENTS

| | | | |
|---|---|---|---|
| 2009/0015199 A1* | 1/2009 | Kitanaka | B60L 11/1868 320/118 |
| 2012/0173179 A1* | 7/2012 | Matsumoto | B60L 11/123 702/63 |
| 2014/0055080 A1* | 2/2014 | Ishikura | B60M 3/00 320/103 |

FOREIGN PATENT DOCUMENTS

| | | |
|---|---|---|
| JP | 2005-278269 A | 10/2005 |
| JP | 2006-34041 A | 2/2006 |

(Continued)

OTHER PUBLICATIONS

Decision to Grant a Patent in JP Patent Application No. 2012-277158, mailed Dec. 8, 2015.
(Continued)

*Primary Examiner* — Jared Fureman
*Assistant Examiner* — Joel Barnett
(74) *Attorney, Agent, or Firm* — Kanesaka Berner and Partners LLP

(57) ABSTRACT

A charging and discharging control device includes a pantograph point voltage detection unit configured to detect a pantograph point voltage of a vehicle, a charging and discharging control unit configured to charge a power storage device provided in a vehicle when the pantograph point voltage is greater than or equal to a charging voltage threshold value and discharge the power storage device when the pantograph point voltage is less than a discharging
(Continued)

voltage threshold value, a load determination unit configured to determine whether an absolute value of load power for the vehicle is less than a load power threshold value, and a charging and discharging control change unit configured to reduce any one of more of the charging voltage threshold value, the discharging voltage threshold value, and charging/discharging impedance when the absolute value of the load power is less than the load power threshold value.

11 Claims, 9 Drawing Sheets

(51) Int. Cl.
    *H02J 7/34* (2006.01)
    *H01M 10/44* (2006.01)
    *H01M 10/48* (2006.01)
    *H02J 7/00* (2006.01)
    *H02J 7/04* (2006.01)
    *H01M 10/42* (2006.01)

(52) U.S. Cl.
    CPC ....... *B60L 11/1838* (2013.01); *H01M 10/441* (2013.01); *H01M 10/482* (2013.01); *H02J 7/0021* (2013.01); *H02J 7/045* (2013.01); *H02J 7/34* (2013.01); *B60L 2200/26* (2013.01); *H01M 2010/4271* (2013.01); *H01M 2220/20* (2013.01); *Y02T 10/7005* (2013.01); *Y02T 10/7055* (2013.01); *Y02T 10/7072* (2013.01); *Y02T 90/14* (2013.01)

(56) References Cited

FOREIGN PATENT DOCUMENTS

| JP | 2010-130829 A | 6/2010 |
| JP | 2012-105407 A | 5/2012 |
| JP | 2012-175803 A | 9/2012 |
| JP | 2012-197055 A | 10/2012 |
| JP | 2013-162582 A | 8/2013 |

OTHER PUBLICATIONS

International Search Report Nov. 26, 2013, corresponding to International patent application No. PCT/JP2013/076361.
Written Opinion mailed Nov. 26, 2013, corresponding to International patent application No. PCT/JP2013/076361.

* cited by examiner

CHARGING AND DISCHARGING CONTROL DEVICE, CHARGING AND DISCHARGING CONTROL METHOD, PROGRAM AND VEHICLE TRAFFIC SYSTEM

RELATED APPLICATIONS

The present application is a National Phase of International Application Number PCT/JP2013/076361 filed Sep. 7, 2013, which claims priority to Japanese Application Number 2012-277158, filed Dec. 19, 2012.

TECHNICAL FIELD

The present invention relates to a charging and discharging control device for controlling charging and discharging of a power storage device mounted on a vehicle, a charging and discharging control method, a program, and a vehicle traffic system using the vehicle equipped with the power storage device.

Priority is claimed on Japanese Patent Application No. 2012-277158, filed Dec. 19, 2012, the content of which is incorporated herein by reference.

BACKGROUND ART

In recent years, secondary batteries applicable even in a steep load change in large capacity have been developed and the development of railroad vehicles equipped with such secondary batteries has also been progressed. Therefore, power peak-cutting technology in which the secondary battery (power storage device) absorbs a steep change in power consumption or regenerative power occurring during power running or braking of the vehicle and hence a voltage change due to a power change is prevented from occurring on an overhead wire has been studied. Thereby, it is possible to reduce the costs necessary to manufacture and maintain in-vehicle electric components or ground facilities.

In addition, as technology related to this, a method of constantly maintaining a power system having a power storage device in a normally operable state constantly by appropriately controlling a state of charge (SOC) of the power storage device based on a voltage change of the overhead wire has been disclosed (Patent Literature 1). Here, for charging and discharging of the power storage device, as disclosed in Patent Literature 1, a technique of mounting an overhead voltage detection device and a charging and discharging control device and controlling a charging/discharging amount of the power storage device depending on the overhead wire voltage has been adopted.

In particular, in the charging and discharging control device disclosed in Patent Literature 1, means in which a predetermined charging or discharging voltage threshold value is set and charging or discharging is performed in the power storage device when a detected overhead wire voltage is greater than or equal to or less than the predetermined charging or discharging voltage threshold value is taken. This is to prevent the life of the power storage device from being shortened due to free charging or discharging through a voltage change in the overhead wire. Accordingly, when the overhead wire voltage is greater than or equal to the above-described discharging voltage threshold value and less than the charging voltage threshold value, the charging and discharging control device is controlled so that the power storage device is not freely charged and discharged in a relation to the overhead wire voltage.

CITATION LIST

Patent Literature

Patent Literature 1

Japanese Unexamined Patent Application, First Publication No. 2006-34041

SUMMARY OF INVENTION

Technical Problem

However, in the charging/discharging control method as disclosed in Patent Literature 1, universal control parameters (a charging voltage threshold value, a discharging voltage threshold value, and the like) in the charging and discharging control device are used. In addition, the control parameters are generally set under the assumption that the power storage device mounted on the own vehicle is charged or discharged during power running or braking of the own vehicle.

Here, a situation in which another vehicle is stopped in the vicinity of a certain vehicle in which power running is being performed is considered. The overhead wire voltage in the vehicle in which power running is being performed decreases because a motor of the vehicle in which the power running is being performed becomes a high load. The overhead wire voltage in the vehicle in which the power running is being performed is less than the predetermined discharging voltage threshold value and therefore the power storage device mounted on the own vehicle starts to be discharged. On the other hand, although the overhead wire voltage in the other vehicle which is stopped decreases in association with a decrease of the overhead wire voltage in the vehicle in which the power running is being performed, the voltage does not decrease by an amount of the overhead wire voltage in the vehicle in which the power running is being performed due to an influence of overhead wire resistance. Accordingly, even when a vehicle which is stopped is configured to supply power to a vehicle in which power running is being performed, it is difficult to discharge the vehicle which is stopped for the vehicle in which the power running is being performed because a preset discharging voltage threshold value is too low. Likewise, even when the power storage device mounted on another vehicle stopped in the vicinity of a certain vehicle in which braking is being performed is charged with regenerative power generated by the vehicle in which braking is being performed, it is difficult to perform charging from the vehicle which is being braked to the vehicle which is stopped because a preset charging voltage threshold value is too high in the vehicle which is stopped.

Here, a peak value or an effective value of a charging/discharging current capable of being generated by the power storage device mounted on the vehicle increases when a form in which only the power storage device mounted on the own vehicle is exclusively charged or discharged is taken with respect to power consumption or regenerative power occurring in association with the power running or braking of the own vehicle. Thus, there is a need for adopting a secondary battery having a high current rating to cope with heat generation or a short life of the power storage device accelerated due to the increase in the peak value or the effective value of the charging/discharging current and consequently there is a problem in that costs necessary for the power storage device increase.

Therefore, an objective of the present invention is to provide a charging and discharging control device, a charging and discharging control method, a program, and a vehicle traffic system capable of solving the aforementioned problem.

Solution to Problem

According to a first aspect of the present invention, a charging and discharging control device includes: a pantograph point voltage detection unit configured to detect a pantograph point voltage of a vehicle which performs power running and braking based on power exchange with an overhead wire; a charging and discharging control unit configured to charge a power storage device provided in the vehicle when the pantograph point voltage is greater than or equal to a predetermined charging voltage threshold value and discharge the power storage device when the pantograph point voltage is less than a predetermined discharging voltage threshold value; a load determination unit configured to determine whether an absolute value of load power for the vehicle is less than a predetermined load power threshold value; and a charging and discharging control change unit configured to reduce any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the vehicle is less than the predetermined load power threshold value is satisfied.

In addition, according to a second aspect of the present invention, in the charging and discharging control device of the first aspect, the charging and discharging control change unit performs mitigation to reduce a difference between the charging voltage threshold value and the discharging voltage threshold value when the absolute value of load power of the vehicle is less than the predetermined load power threshold value.

In addition, according to a third aspect of the present invention, in the charging and discharging control device of the first or second aspect, the load determination unit stores a plurality of predetermined load power threshold values, and the charging and discharging control change unit changes a mitigation degree of at least one of the charging voltage threshold value, the discharging voltage threshold value, and the charging/discharging impedance, depending on the absolute value of the load power being less than one of the plurality of load power threshold values.

In addition, according to a fourth aspect of the present invention, the charging and discharging control device of any one of the first to third aspects further includes: a change permission signal reception unit configured to receive a charging/discharging characteristic change permission signal from an external device, wherein the charging and discharging control change unit reduces any one or more of the charging voltage threshold value, the discharging voltage threshold value, and the charging/discharging impedance when the condition that the change permission signal reception unit has input the charging/discharging characteristic change permission signal is further satisfied.

In addition, according to a fifth aspect of the present invention, a vehicle traffic system includes: a plurality of vehicles configured to perform power running and braking based on power exchange with an overhead wire; and an operation management device configured to manage operations of all the plurality of vehicles by instructing each of the plurality of vehicles to perform the power running and the braking, wherein each of the plurality of vehicles includes a charging and discharging control device having a pantograph point voltage detection unit configured to detect a pantograph point voltage of an own vehicle; a charging and discharging control unit configured to charge a power storage device provided in the own vehicle when the pantograph point voltage is greater than or equal to a predetermined charging voltage threshold value and discharge the power storage device when the pantograph point voltage is less than a predetermined discharging voltage threshold value; a load determination unit configured to determine whether an absolute value of load power for the own vehicle is less than a predetermined load power threshold value; and a charging and discharging control change unit configured to reduce any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the own vehicle is less than the predetermined load power threshold value is satisfied.

In addition, according to a sixth embodiment of the present invention, in the vehicle traffic system of the fifth aspect, the charging and discharging control device provided in each of the plurality of vehicles includes a change permission signal reception unit configured to receive a charging/discharging characteristic change permission signal from the operation management device, the charging and discharging control change unit reduces any one or more of the charging voltage threshold value, the discharging voltage threshold value, and charging/discharging impedance indicating an increase/decrease amount of a charging/discharging current depending on the increase/decrease amount of the pantograph point voltage when the condition that the charging/discharging characteristic change permission signal has been input is further satisfied, and the operation management device transmits the charging/discharging characteristic change permission signal to each of the plurality of vehicles.

In addition, according to a seventh aspect of the present invention, in the vehicle traffic system of the fifth or sixth aspect, at least one of the plurality of vehicles is stopped temporarily or regularly in a state in which the charging and discharging control device is operable.

In addition, according to an eighth aspect of the present invention, in the vehicle traffic system of any one of the fifth to seventh aspects, the operation management device separately detects a determination state in the load determination unit provided in the plurality of vehicles, and, when the absolute value of the load power of the vehicle is less than a predetermined load power threshold value in a first vehicle which is at least one of the plurality of vehicles, the operation management device instructs a second vehicle to perform the power running or braking.

In addition, according to a ninth aspect of the present invention, in the vehicle traffic system of the eighth aspect, the operation management device further instructs the second vehicle to perform the power running or braking when the vehicle in which the absolute value of the load power is less than a predetermined load power threshold value is in a predetermined power transmission available range from the second vehicle.

In addition, according to a tenth aspect of the present invention, a charging and discharging control method includes: detecting a pantograph point voltage of a vehicle which performs power running and braking based on power exchange with an overhead wire; charging a power storage device provided in the vehicle when the pantograph point voltage is greater than or equal to a predetermined charging voltage threshold value; discharging the power storage device when the pantograph point voltage of the vehicle is less than a predetermined discharging voltage threshold value; determining whether an absolute value of load power for the vehicle is less than a predetermined load power threshold value; and reducing any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power is less than the predetermined load power threshold value is satisfied.

In addition, according to an eleventh aspect of the present invention, a program is provided for causing a computer of a charging and discharging control device, which includes a pantograph point voltage detection unit configured to detect a pantograph point voltage of a vehicle which performs power running and braking based on power exchange with an overhead wire and a charging and discharging control unit configured to charge a power storage device provided in the vehicle when the pantograph point voltage is greater than or equal to a predetermined charging voltage threshold value and discharge the power storage device when the pantograph point voltage is less than a predetermined discharging voltage threshold value, to function as: a load determination means configured to determine whether an absolute value of load power for the vehicle is less than a predetermined load power threshold value; and a charging and discharging control change means configured to reduce any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the vehicle is less than the predetermined load power threshold value is satisfied.

Advantageous Effects of Invention

According to the above-described charging and discharging control device, vehicle traffic system, charging and discharging control method, and program, an effect of reducing a peak value or an effective value of a charging/discharging current in a power storage device mounted on a vehicle and reducing cost of the power storage device is obtained.

DESCRIPTION OF EMBODIMENTS

<First Embodiment>

Hereinafter, a charging and discharging control device according to the first embodiment of the present invention will be described with reference to the drawings.

Figure 1:
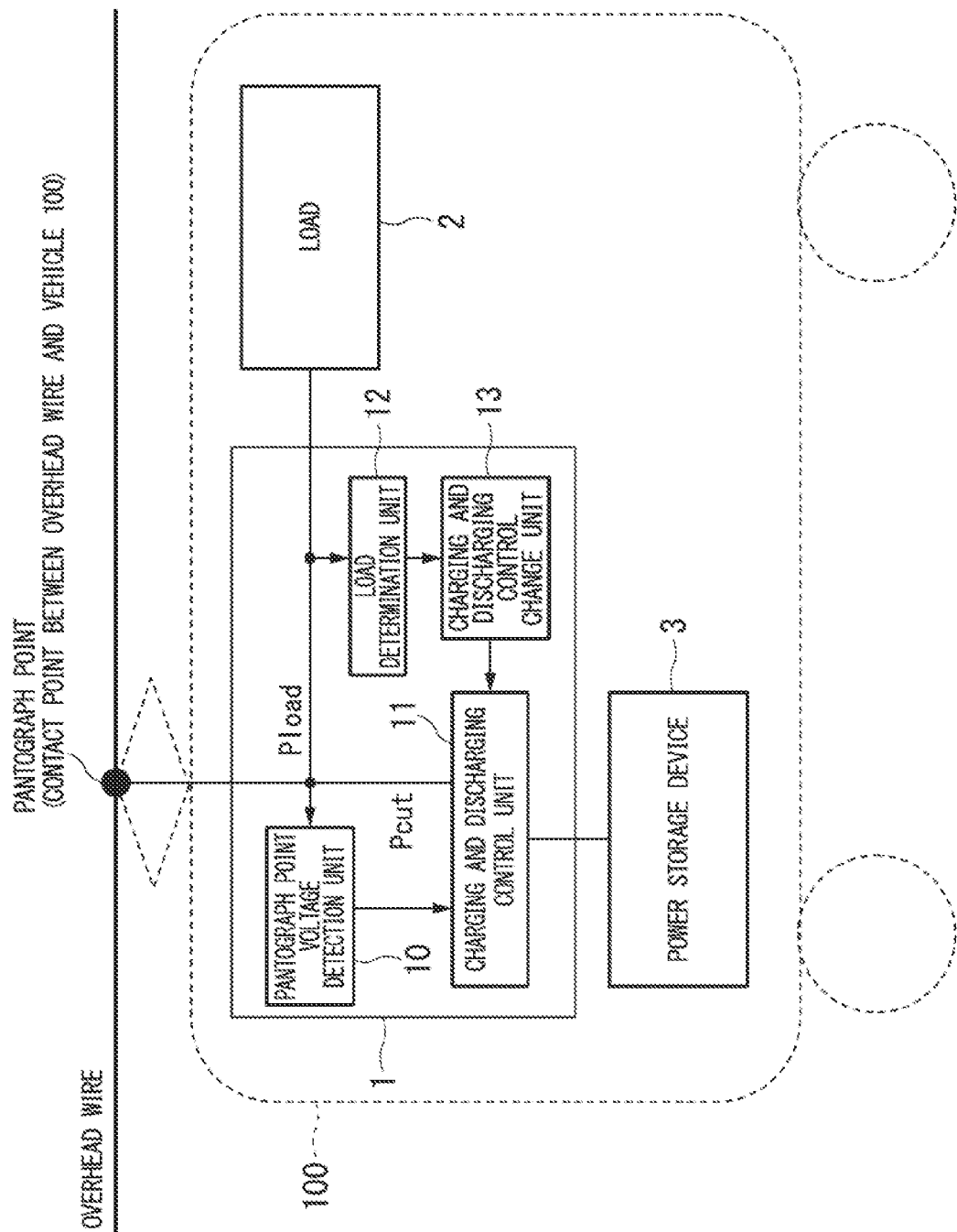
FIG. 1 is a first diagram illustrating a functional configuration of a charging and discharging control device according to a first embodiment of the present invention.

FIG. 1 is a first diagram illustrating a functional configuration of the charging and discharging control device according to the first embodiment. In FIG. 1, the charging and discharging control device 1 is illustrated.

A charging and discharging control device 1 includes a pantograph point voltage detection unit 10 configured to detect a pantograph point voltage of a vehicle which performs power running and braking based on power exchange with an overhead wire. In addition, the charging and discharging control device 1 includes a charging and discharging control unit 11 configured to charge a power storage device 3 provided in the vehicle when the pantograph point voltage is greater than or equal to a predetermined charging voltage threshold value and discharge the power storage device 3 when the pantograph point voltage is less than a predetermined discharging voltage threshold value.

Here, the "pantograph point voltage" is a voltage applied to part of an overhead wire and has a voltage value at a pantograph point (a contact point between the overhead wire and a vehicle 100) illustrated in FIG. 1. The pantograph point voltage detection unit 10, for example, is constituted of an analog-to-digital (A/D) converter or the like, and is a functional unit configured to output a pantograph point voltage value as information to the charging and discharging control unit 11. On the other hand, as described above, the charging and discharging control unit 11 is a functional unit configured to actually charge and discharge the power storage device 3 with a predetermined voltage based on the charging voltage threshold value, the discharging voltage threshold value, and the like while referring to the pantograph point voltage value input from the pantograph point voltage detection unit 10. A specific control method of the charging and discharging control unit 11 will be described below.

Also, the power storage device 3 is a power storage unit equipped with a chargeable/dischargeable secondary battery. For example, a lithium ion battery or the like is used as the secondary battery. The vehicle 100 according to this embodiment includes the power storage device 3 in the own vehicle for the purpose of peak cutting of an overhead wire voltage.

The charging and discharging control device 1 includes a load determination unit 12 configured to determine whether an absolute value of load power for the vehicle is less than a predetermined load power threshold value. The charging and discharging control device 1 includes a charging and discharging control change unit 13 configured to reduce any one or more of the charging voltage threshold value, the discharging voltage threshold value, and charging/discharging impedance when the absolute value of the load power of the vehicle is less than the predetermined load power threshold value. Here, the "charging/discharging impedance" is an impedance value indicating an increase/decrease amount of a charging/discharging current depending on an increase/decrease amount of the pantograph point voltage. In addition, the "load power" refers to power to be consumed by the load 2.

The load 2, for example, is a motor requiring high power consumption in a power running time (acceleration time) of the vehicle 100. In addition, the load 2 also functions as a power generator configured to generate "regenerative power" by a regenerative brake in a braking time (deceleration time) of the vehicle 100. Also, in this embodiment, the regenerative power is also designated as a type of the above-described "load power" and further a power value generated by the load 2 serving as the power generator is denoted by a negative value of the "load power."

The load determination unit 12 determines whether the absolute value of the above-described "load power" is less than a predetermined load power threshold value, and outputs a predetermined determination signal indicating a determination result to the charging and discharging control change unit 13. When it is determined that the absolute value of the load power is less than the predetermined load power threshold value based on the determination signal, the charging and discharging control change unit 13 instructs the charging and discharging control unit 11 to change the above-described charging or discharging voltage threshold value. Specific instruction content will be described below.

Figure 2:
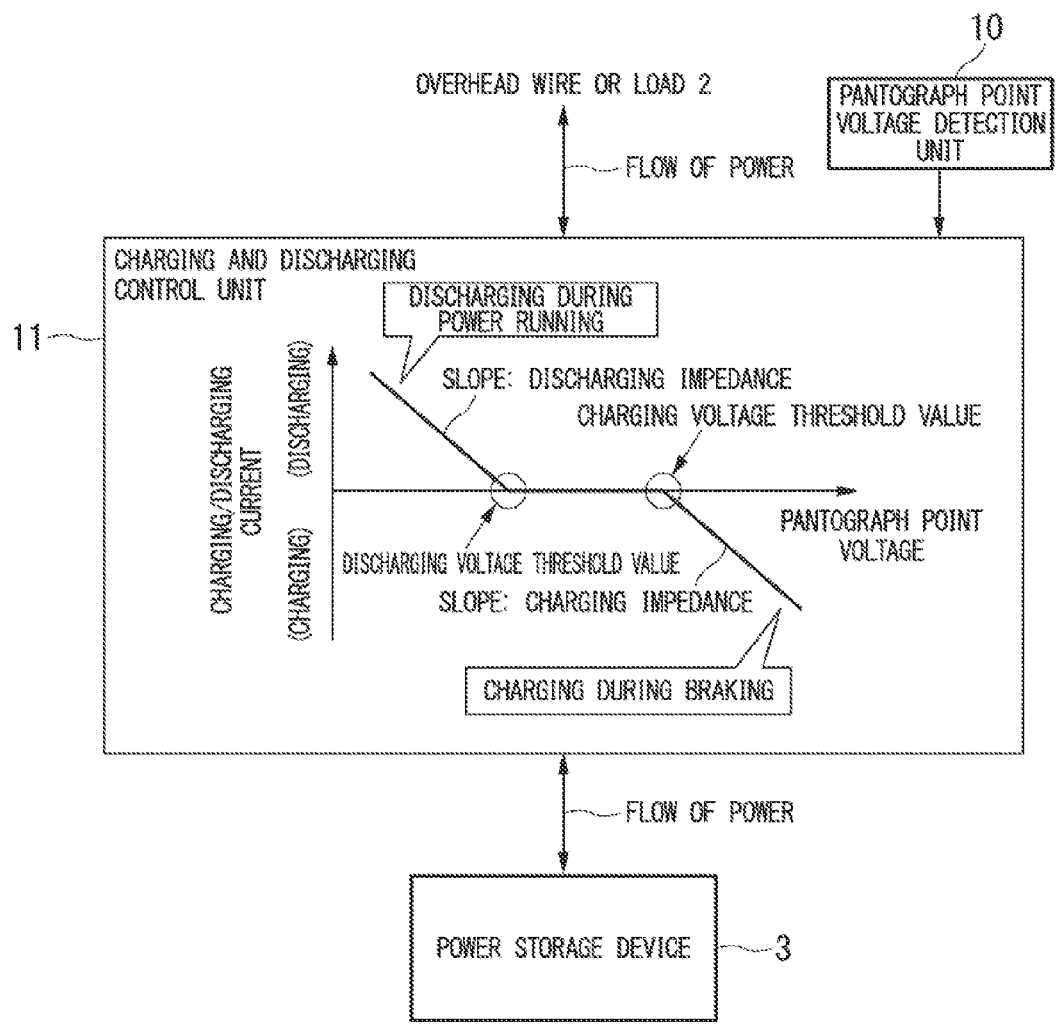
FIG. 2 is a diagram illustrating content of charging and discharging control of the charging and discharging control unit according to the first embodiment of the present invention.

FIG. 2 is a diagram illustrating content of charging and discharging control of the charging and discharging control unit according to the first embodiment of the present invention.

The charging and discharging control unit 11 according to this embodiment performs charging and discharging control as illustrated in FIG. 2 for the power storage device 3. The charging and discharging control unit 11 is used to prevent a considerable change in an overhead wire voltage along with the power storage device 3 (peak cutting). The vertical axis (charging/discharging current) of the graph illustrated in FIG. 2 represents a value of a current (charging current) flowing to the power storage device 3 or a current (discharging current) flowing from the power storage device 3 indicated by the charging and discharging control change unit 13. The horizontal axis (pantograph point voltage) denotes a value detected by the pantograph point voltage detection unit 10.

That is, the charging and discharging control unit 11 performs predetermined discharging from the power storage device 3 when the pantograph point voltage is less than the predetermined discharging voltage threshold value in the vehicle 100 as illustrated in FIG. 2. Here, the pantograph point voltage significantly decreases mainly when the load 2 requires high power consumption, that is, in the power running time. Accordingly, the charging and discharging control unit 11 plays a role in preventing the overhead wire voltage (pantograph point voltage) from being significantly decreased by discharging the power storage device 3 to supplement the power consumption in the power running time of the vehicle 100.

On the other hand, the charging and discharging control unit 11 performs predetermined charging to the power storage device 3 when the pantograph point voltage is greater than the predetermined charging voltage threshold value in the vehicle 100 as illustrated in FIG. 2. Here, the pantograph point voltage significantly increases mainly when the load 2 generates high regenerative power, that is, in the braking time. Accordingly, the charging and discharging control unit 11 plays a role in preventing the overhead wire voltage (pantograph point voltage) from being significantly increased by causing regenerative power to be absorbed into the power storage device 3 to charge the power storage device 3 in the braking time of the vehicle 100.

In addition, the charging impedance or the discharging impedance in FIG. 2 is a ratio (a slope of the graph) of an increase/decrease amount of a charging/discharging current depending on an increase/decrease amount of the pantograph point voltage in the power storage device 3. When the charging/discharging impedance is high (the slope of the graph is small), the increase/decrease amount of the charging/discharging current for the increase/decrease amount of the pantograph point voltage becomes small. In contrast, when the charging/discharging impedance is low (the slope of the graph is large), the increase/decrease amount of the charging/discharging current for the increase/decrease amount of the pantograph point voltage becomes large.

Also, the charging and discharging control unit 11 provides and defines predetermined widths by setting charging and discharging voltage threshold values to be different as illustrated in FIG. 2. This is because it is not preferable to freely charge and discharge the power storage device 3 even when the change in the overhead wire voltage (pantograph point voltage) is small in terms of the life of the power storage device 3 (deterioration with time). In addition, this is to allow an operator to easily perform maintenance (for example, an SOC adjustment operation) of the power storage device 3 by providing a state in which the power storage device 3 is not charged/discharged for an overhead wire voltage (a state in which the power storage device is separated from the overhead wire).

Figure 3A:
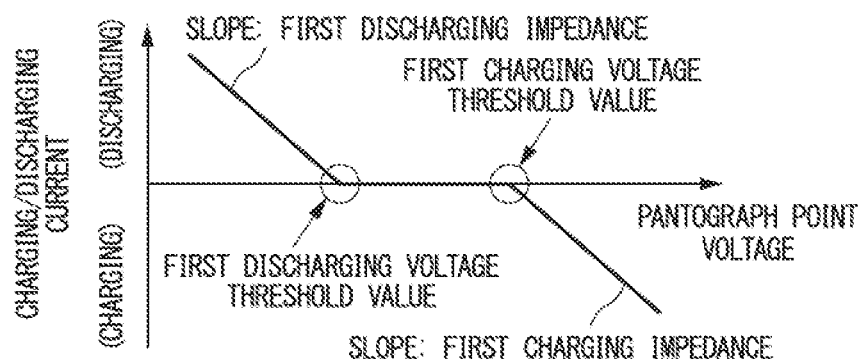
FIG. 3A is a first diagram illustrating specific instruction content of a charging and discharging control change unit according to the first embodiment of the present invention.
Figure 3B:
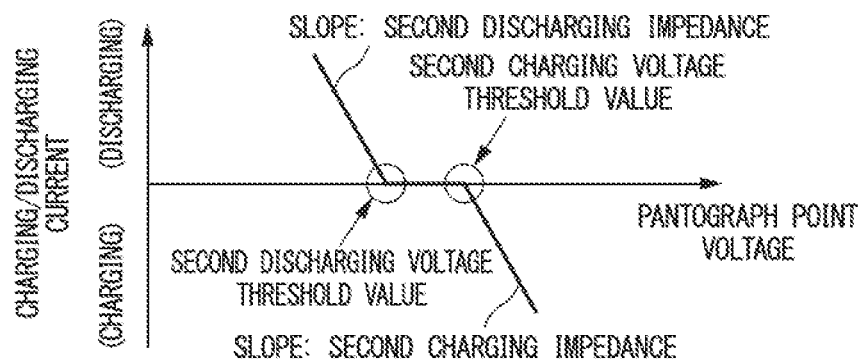
FIG. 3B is a second diagram illustrating specific instruction content of a charging and discharging control change unit according to the first embodiment of the present invention.

FIGS. 3A and 3B are first and second diagrams illustrating specific instruction content of the charging and discharging control change unit according to the first embodiment of the present invention.

Next, an operation of the charging and discharging control change unit 13 according to this embodiment will be described with reference to FIGS. 3A and 3B. First, the charging and discharging control change unit 13 receives a notification of whether the absolute value of the load power in the load 2 is less than the predetermined load power threshold value from the load determination unit 12. Then, the charging and discharging control change unit 13 instructs to change the above-described control characteristic set in the charging and discharging control unit 11 depending on the notification from the load determination unit 12.

When the charging and discharging control change unit 13 has received the notification indicating that the absolute value of the load power is less than the predetermined load power threshold value from the load determination unit 12, the charging and discharging control change unit 13 instructs the charging and discharging control unit 11 to change the control characteristics to mitigate a charging/discharging condition. Here, "mitigating the charging/discharging condition" is an operation of performing any one or more combinations of (1) increasing the discharging voltage threshold value, (2) decreasing the charging voltage threshold value, (3) decreasing the discharging impedance, and (4) decreasing the charging impedance.

FIG. 3A illustrates charging/discharging control characteristics of the charging and discharging control unit 11 in a "heavy load time." Here, the "heavy load time" indicates when the vehicle 100 is in a state in which "the absolute value of the load power in the load 2 is greater than or equal to the predetermined load power threshold value." Specifically, when there is high power consumption in the load 2, that is, when the vehicle 100 is performing power running, the vehicle 100 is said to be in the "heavy load time" in which the above-described condition is satisfied. In addition, because the absolute value of the load power is "greater than or equal to the predetermined load power threshold value" in the above-described condition, the vehicle 100 is said to be in the "heavy load time" in which the above-described condition is satisfied when high regenerative power (negative load power) is generated in the load 2, that is, when the vehicle 100 is being braked.

Also, in this embodiment, the above-described load power threshold value is not limited to one type. For example, a load power threshold value to be referred to when the load power is positive (when power is consumed by the load 2) and a load power threshold value to be referred to when the load power is negative (when power is generated by the load 2) may be different values.

Then, the charging and discharging control change unit 13 outputs an instruction for setting charging and discharging control characteristics as illustrated in FIG. 3A to the charging and discharging control unit 11 when the vehicle 100 is in the "heavy load time." Also, the charging and discharging characteristics illustrated in FIG. 3A are mainly defined by four parameters of a "first discharging voltage threshold value," a "first charging voltage threshold value," "first discharging impedance," and "first charging impedance."

On the other hand, FIG. 3B illustrates charging/discharging control characteristics of the charging and discharging control unit 11 in a "light load time." Here, the "light load time" indicates a state in which "the absolute value of the load power in the load 2 is less than the predetermined load power threshold value." That is, this is the time when there is no high power consumption in the load 2 or when no high regenerative power is generated, and, more specifically, corresponds to a state in which the vehicle 100 is stopped or coasting (running at a constant speed). Then, the charging and discharging control change unit 13 outputs an instruction for setting charging and discharging control characteristics as illustrated in FIG. 3B to the charging and discharging control unit 11 in the "light load time."

Also, the charging and discharging characteristics illustrated in FIG. 3B are mainly defined by four parameters of a "second discharging voltage threshold value," a "second charging voltage threshold value," "second discharging impedance," and "second charging impedance." Here, these four parameters are set to satisfy at least any one or more of the aforementioned four conditions. For example, when the absolute value of the load power of the vehicle 100 is less than the predetermined load power threshold value, the charging and discharging control change unit 13 may mitigate charging and discharging conditions to reduce a difference between the charging voltage threshold value and the discharging voltage threshold value. More specifically, for example, the charging and discharging control change unit 13 sets the second discharging voltage threshold value to a value greater than the first discharging voltage threshold value and sets the second charging voltage threshold value to a value less than the first charging voltage threshold value. In addition, the charging and discharging control change unit 13 may set the second discharging impedance to a value less than the first discharging impedance and set the second charging impedance to a value less than the first charging impedance.

Figure 4:
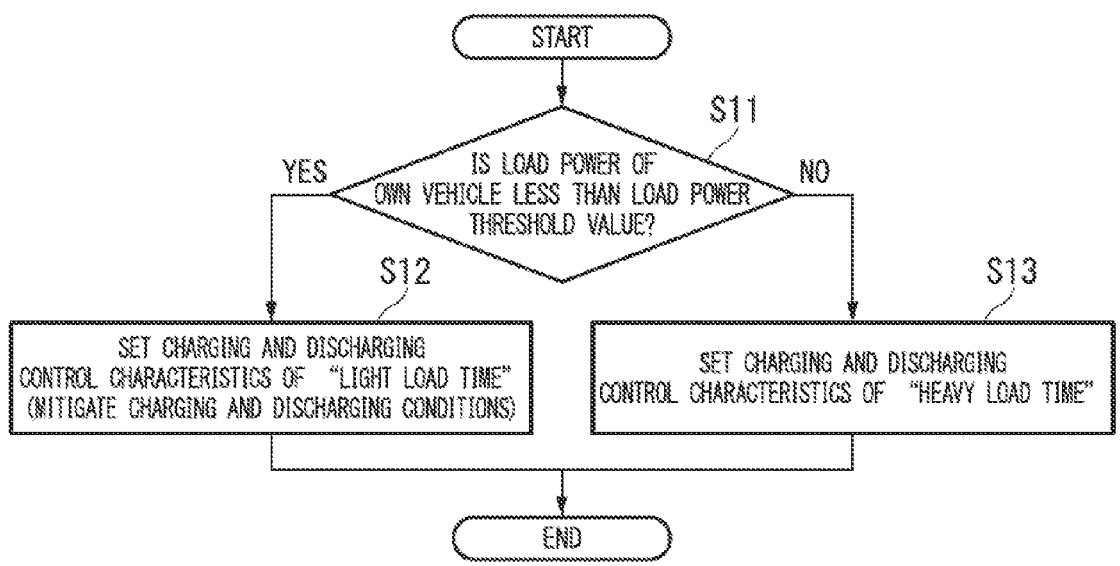
FIG. 4 is a diagram illustrating a processing flow of the charging and discharging control change unit according to the first embodiment of the present invention.

FIG. 4 is a diagram illustrating a processing flow of the charging and discharging control change unit according to the first embodiment of the present invention.

A flow of a specific process in the above-described charging and discharging control change unit 13 will be sequentially described. First, the charging and discharging control change unit 13 detects whether the absolute value of the load power of the own vehicle is less than the load power threshold value via the load determination unit 12 (step S11). Then, when the absolute value of the load power is less than the load power threshold value, the charging and discharging control change unit 13 instructs the charging and discharging control unit 11 to set charging and discharging characteristics of the "light load time" and causes the charging and discharging control unit 11 to mitigate the charging and discharging conditions (step S12). On the other hand, when the absolute value of the load power is greater than or equal to the load power threshold value, the charging and discharging control change unit 13 instructs the charging and discharging control unit 11 to set charging and discharging control characteristics of the "heavy load time" and causes the charging and discharging control unit 11 to enhance the charging and discharging conditions (step S13).

The charging and discharging control change unit 13 performs this processing flow, so that the charging and discharging control device 1 is configured to dynamically change the charging and discharging control characteristics for the power storage device 3 depending on a load situation of the own vehicle.

Figure 5A:
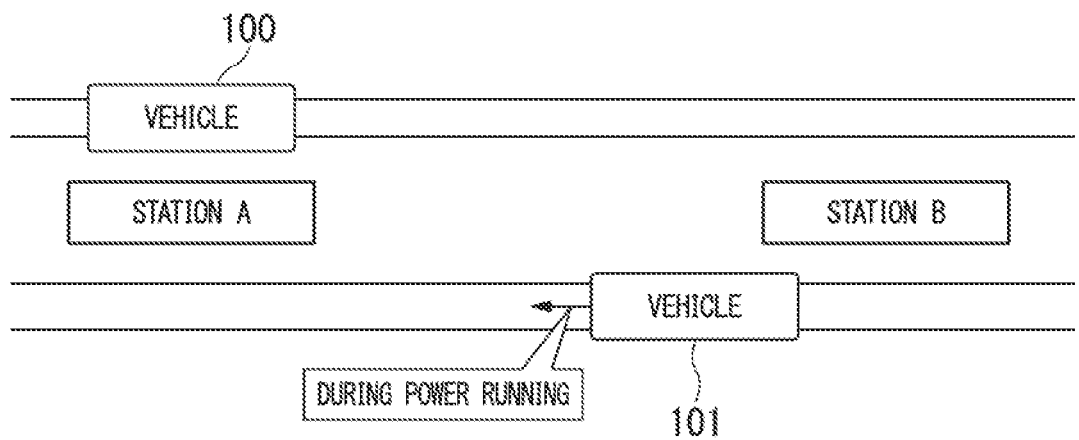
FIG. 5A is a first diagram illustrating an effect of the charging and discharging control device according to the first embodiment of the present invention.
Figure 5B:
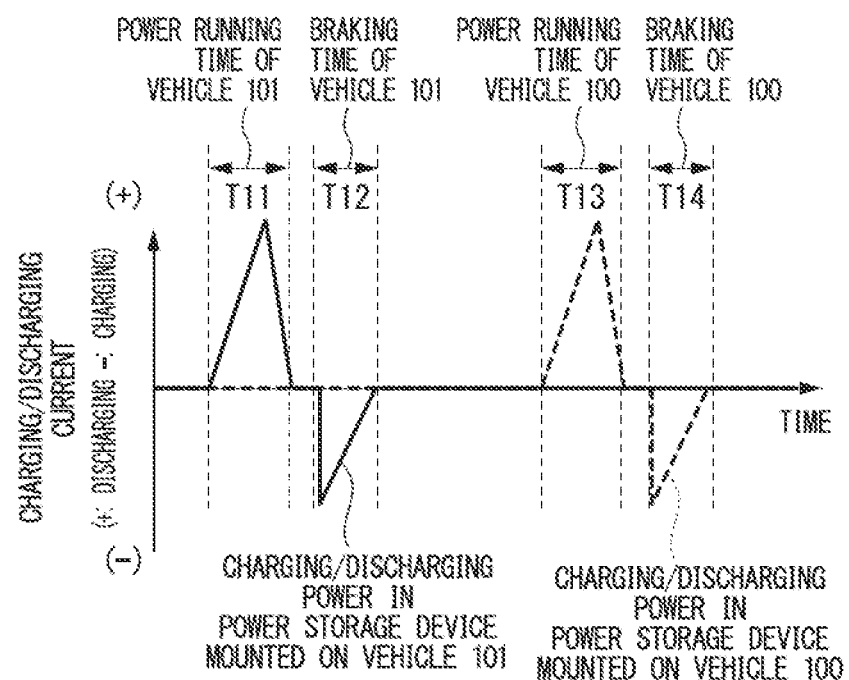
FIG. 5B is a second diagram illustrating an effect of the charging and discharging control device according to the first embodiment of the present invention.
Figure 6A:
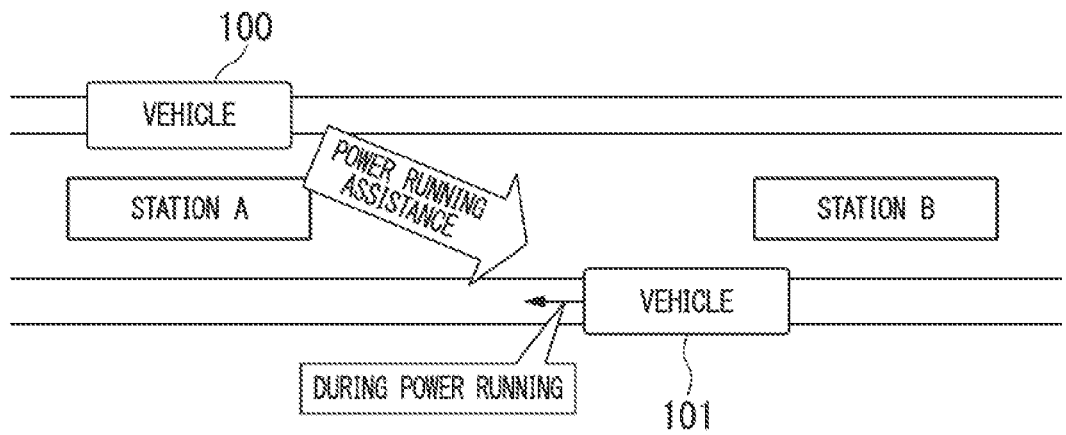
FIG. 6A is a third diagram illustrating an effect of the charging and discharging control device according to the first embodiment of the present invention.
Figure 6B:
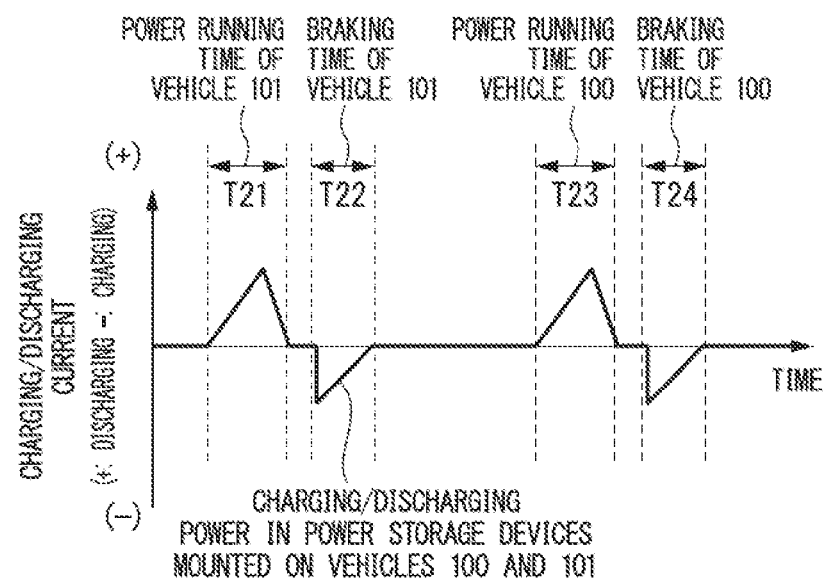
FIG. 6B is a fourth diagram illustrating an effect of the charging and discharging control device according to the first embodiment of the present invention.

FIGS. 5A and 5B are first and second diagrams illustrating effects of the charging and discharging control device according to the first embodiment of the present invention. In addition, FIGS. 6A and 6B are third and fourth diagrams illustrating effects of the charging and discharging control device according to the first embodiment of the present invention.

Here, specific effects of the charging and discharging control devices 1 according to this embodiment will be described while performing a comparison with a conventional charging and discharging control device.

FIGS. 5A and 5B illustrate charging and discharging situations of the power storage device when vehicles 100 and 101 are equipped with the conventional charging and discharging control device. Here, FIG. 5A illustrates a state in which the vehicle 100 is temporarily stopped at station A and illustrates a state in which the vehicle 101 is performing power running after departing from station B. Here, in the conventional charging and discharging control device mounted on the vehicles 100 and 101, the charging and discharging characteristics remain fixed to the characteristics illustrated in FIG. 3A.

First, in a state of FIG. 5A, the pantograph point voltage of the vehicle 101 itself decreases in association with the power running of the vehicle 101. Then, when the pantograph point voltage is less than the discharging voltage threshold value set in the vehicle 101 itself, the power storage device 3 mounted on the vehicle 101 starts to be discharged. However, the power running of the vehicle 101 does not decrease the pantograph point voltage in the vehicle 100 which is stopped to a value less than the discharging voltage threshold value set in the vehicle 100 (due to an influence of overhead wire resistance). Accordingly, during power running of the vehicle 101, the power storage device 3 mounted on the vehicle 100 is not discharged. That is, during the power running of the vehicle 101, only the power storage device 3 mounted on the vehicle 101 is exclusively discharged (period T11 in FIG. 5B). Likewise, even when the vehicle 101 has started to be braked for a stop at station A, only the power storage device 3 mounted on the vehicle 101 is exclusively charged (period T12).

In addition, a similar action occurs even in the power running and braking times of the vehicle 100. That is, the pantograph point voltage of the vehicle 100 itself is less than the discharging voltage threshold value (set in the vehicle 100 itself) in association with the power running of the vehicle 100, but the pantograph point voltage of the vehicle 101 does not decrease to a value less than the discharging voltage threshold value (set in the vehicle 101 itself). Accordingly, as described above, only the power storage device 3 mounted on the vehicle 100 is exclusively discharged during power running of the vehicle 100 (period T13 in FIG. 5B). Likewise, even when the vehicle 100 has started to be braked for a stop at station B, the power storage device 3 is exclusively charged (period T14).

On the other hand, FIGS. 6A and 6B illustrate charging and discharging situations of the power storage device 3 when the vehicles 100 and 101 are equipped with the charging and discharging control devices 1 according to this embodiment. Here, like FIG. 5A, FIG. 6A illustrates a state (during a stop) in which the vehicle 100 is being temporarily stopped at station A and illustrates a state in which the vehicle 101 is performing power running after departing from station B. Here, the charging and discharging control devices 1 mounted on the vehicles 100 and 101 transition the charging/discharging control characteristics to a characteristic in the "heavy load time" illustrated in FIG. 3A and a characteristic in the "light load time" illustrated in FIG. 3B.

The load power of the load 2 of the vehicle 101 which is performing power running is greater than the predetermined load power threshold value and consequently the discharging voltage threshold value of the vehicle 101 is set to the charging/discharging control characteristic (the first discharging voltage threshold value or the first charging voltage threshold value) in the "heavy load time" by the charging and discharging control device 1. On the other hand, because the vehicle 100 is stopped, the discharging voltage threshold value of the vehicle 100 is set to the charging/discharging control characteristic (the second discharging voltage threshold value or the second charging voltage threshold value) in the "light load time" by the charging and discharging control device 1.

In this state, first, the pantograph point voltage of the own vehicle decreases in association with the power running of the vehicle 101. Then, when the pantograph point voltage is less than the first discharging voltage threshold value set in the vehicle 101, the power storage device 3 in the vehicle 101 starts to be discharged. Further, the power running of the vehicle 101 decreases the pantograph point voltage in the vehicle 100 which is stopped to a value less than the "second discharging voltage threshold value" set in the vehicle 100. As a result, during the power running of the vehicle 100, the power storage device 3 mounted on the vehicle 100 also starts to be discharged (this is referred to as power-running assistance (FIG. 6A)). That is, when the charging and discharging control device 1 according to this embodiment has been mounted, the power storage device 3 mounted on the vehicle 100 which is stopped as well as the power storage device 3 mounted on the vehicle 101 starts to be discharged simultaneously during power running of the vehicle 101 (period T21 in FIG. 6B).

Likewise, the case in which the vehicle 101 has started to be braked for a stop at station A is considered. At this time, the pantograph point voltage of the own vehicle increases in association with the braking of the vehicle 101. Then, when the pantograph point voltage is greater than the first charging voltage threshold value set in the vehicle 101, the power storage device 3 in the vehicle 101 starts to be charged. Further, the braking of the vehicle 101 increases the pantograph point voltage in the vehicle 100 which is stopped to a value greater than or equal to the "second charging voltage threshold value" set in the vehicle 100. As a result, during the braking of the vehicle 101, the power storage device 3 mounted on the vehicle 100 also starts to be charged. That is, during the braking of the vehicle 101, the power storage device 3 mounted on the vehicle 100 which is stopped as well as the power storage device 3 mounted on the vehicle 101 starts to be charged simultaneously (period T22).

Thereafter, the vehicle 101 is assumed to have reached station A. At this time, the load power of the load 2 in the vehicle 101 is less than a predetermined load power threshold value. Accordingly, the charging and discharging control change unit 13 in the vehicle 101 changes the charging/discharging control characteristic of the charging and discharging control unit 11 from the charging/discharging control characteristic (the first discharging voltage threshold value or the first charging voltage threshold value) in the "heavy load time" to the charging/discharging control characteristic (the second discharging voltage threshold value or the second charging voltage threshold value) in the "light load time." On the other hand, the vehicle 100 is assumed to have started power running when departing from station A. At this time, the charging and discharging control change unit 13 in the vehicle 100 changes (mitigates) the charging/discharging control characteristic of the charging and discharging control unit 11 from the charging/discharging control characteristic in the "light load time" to the charging/discharging control characteristic in the "heavy load time."Thereafter, the charging/discharging characteristics in the power storage devices 3 of the two vehicles 100 and 101 are the same as the above-described content (periods T23 and T24 in FIG. 6B).

Here, the case in which the conventional charging and discharging control device described with reference to FIGS. 5A and 5B is used is compared with the case in which the charging and discharging control device 1 according to this embodiment described with reference to FIGS. 5A and 5B is used. Then, because the consumption power to be consumed in the power running time and the regenerative power to be generated in the braking time operate in parallel and simultaneously in the two power storage devices, the peak value and the effective value of the charging/discharging current in each power storage device are less than in FIG.

5B. Accordingly, it can be seen that the peak value and the effective value of the charging/discharging current in each power storage device are reduced when the charging and discharging control device 1 according to this embodiment has been used.

According to the charging and discharging control device 1 according to this embodiment, an effect of reducing the peak value and the effective value of the charging/discharging current in the power storage device mounted on the vehicle is obtained. Accordingly, it is possible to reduce the cost required for the power storage device.

Also, the charging and discharging control device 1 according to this embodiment may further have the following functions.

As an example, the charging and discharging control device 1 may have an aspect that the load determination unit 12 stores a plurality of predetermined load power threshold values as described above, and the charging and discharging control change unit 13 changes a mitigation degree of at least one of the charging voltage threshold value, the discharging voltage threshold value, and the charging/discharging impedance changes depending on whether the absolute value of the load power being less than any one of the plurality of load power threshold values.

Specifically, the load determination unit 12 has the "first load power threshold value (Pth1)" and the "second load power threshold value (Pth2)" (Pth1>Pth2), and outputs a state corresponding to any one of the case in which the absolute value of the load power is greater than or equal to Pth1, the case in which the absolute value of the load power is less than Pth1 and greater than or equal to Pth2, and the case in which the absolute value of the load power is less than Pth2 to the charging and discharging control change unit 13. Then, the charging and discharging control change unit 13 sets a charging and discharging control characteristic differing depending on each state in the charging and discharging control unit 11.

In such a manner, the charging and discharging control device 1 can identify a "stationary" state (a state in which the vehicle 100 is stopped regularly without relating to an operation in units of days, for example, a state in which the vehicle 100 is stored in the garage) in which the load power of the vehicle 100 is less than in the "stop" state and set the charging/discharging control characteristic in which a charging/discharging condition has been mitigated depending on the identified state. However, the vehicle 100 according to this embodiment is assumed to be in a state in which at least the charging and discharging control device 1 is operable even in the above-described "stationary" state.

Figure 7:
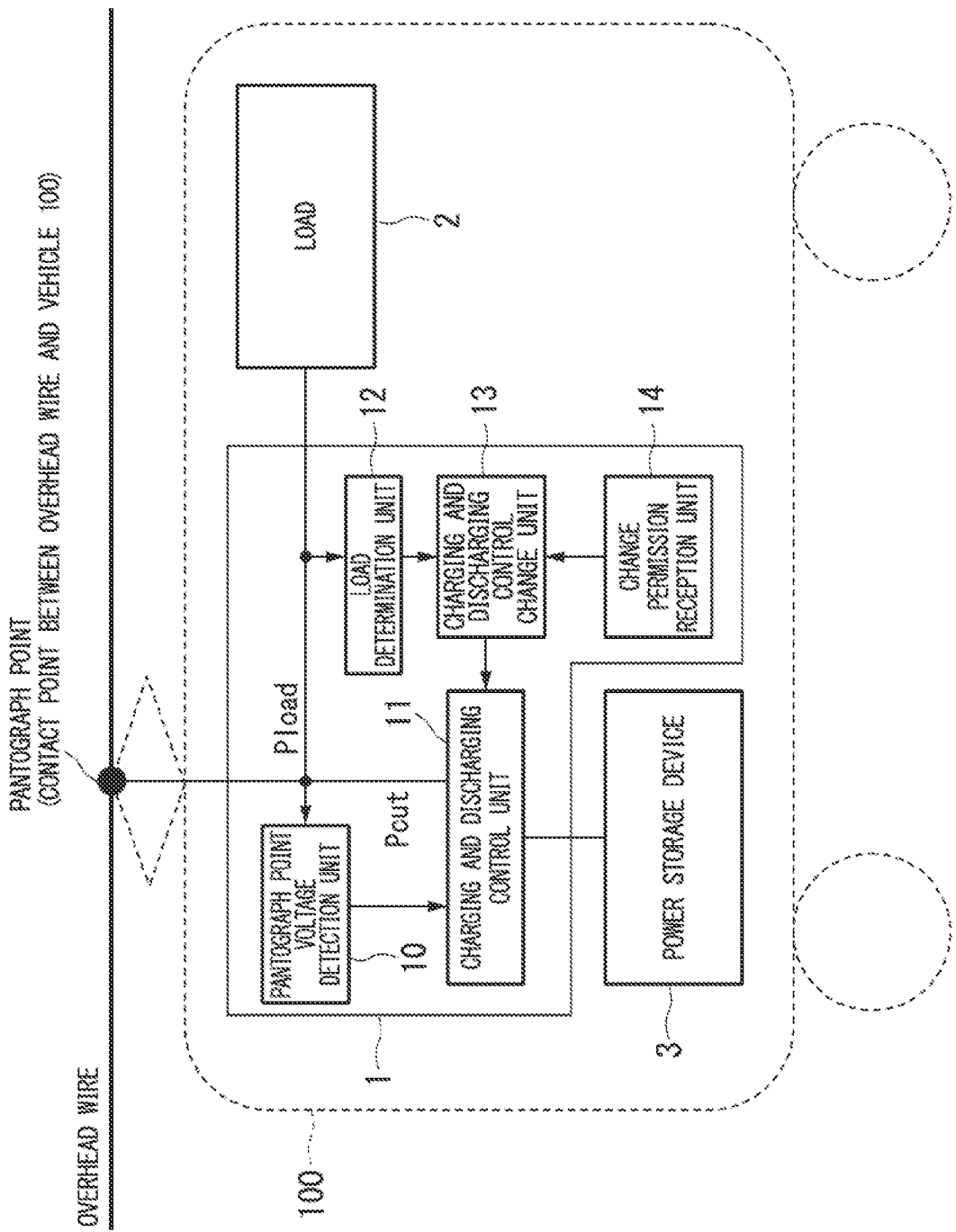
FIG. 7 is a second diagram illustrating a functional configuration of the charging and discharging control device according to the first embodiment of the present invention.

FIG. 7 is a second diagram illustrating a functional configuration of the charging and discharging control device according to the first embodiment of the present invention.

As illustrated in FIG. 7, the charging and discharging control device 1 may further include a change permission signal reception unit 14 configured to receive a charging/discharging characteristic change permission signal from an external device in addition to the pantograph point voltage detection unit 10, the charging and discharging control unit 11, the load determination unit 12, and the charging and discharging control change unit 13. Then, the charging and discharging control change unit 13 may further have an aspect in which any one or more of the charging voltage threshold value, the discharging voltage threshold value, and the charging/discharging impedance are reduced when the change permission signal reception unit 14 has received the charging/discharging characteristic change permission signal.

Specifically, the charging and discharging control change unit 13 may have an aspect in which an instruction to change the charging and discharging control characteristic of the charging and discharging control unit 11 is issued only when a predetermined charging/discharging characteristic change permission signal as well as a determination signal from the load determination unit 12 has been further received from the external device (for example, an operation management device) for managing a plurality of operations including the vehicle 100 via the change permission signal reception unit 14.

Thereby, the charging and discharging control device 1 can further more appropriately change the charging and discharging control characteristics based on a determination from the external device without merely using only the absolute value of the load power in the own vehicle as a determinant.

In addition, the charging and discharging control device 1 according to this embodiment may determine whether to change the charging/discharging control characteristic depending on an SOC of the power storage device 3 mounted on the own vehicle 100. Specifically, the charging and discharging control change unit 13 further includes means for detecting the SOC of the power storage device 3 and may have an aspect in which change instruction content for the charging and discharging control unit 11 is determined depending on the SOC detected by the detecting means in conjunction with an input from the load determination unit 12.

Thereby, the charging and discharging control device 1 according to this embodiment can perform charging/discharging control suitable for the SOC of the power storage device 3 of the own vehicle 100. For example, even when the own vehicle is stopped in a state in which a stored power amount of the power storage device 3 is insufficient, it is difficult to assist with power running of another vehicle. Accordingly, in this case, the charging and discharging control change unit 13 may output an instruction for decreasing only a charging power threshold value without changing a discharging power threshold value. In contrast, when the power storage device 3 is in a state close to full charging, regenerative power generated in another vehicle is not received. Accordingly, in this case, the charging and discharging control change unit 13 may output an instruction for increasing only the discharging power threshold value without changing the charging power threshold value.

<Second Embodiment>

Hereinafter, a vehicle traffic system according to the second embodiment of the present invention will be described with reference to the drawings.

Figure 8:
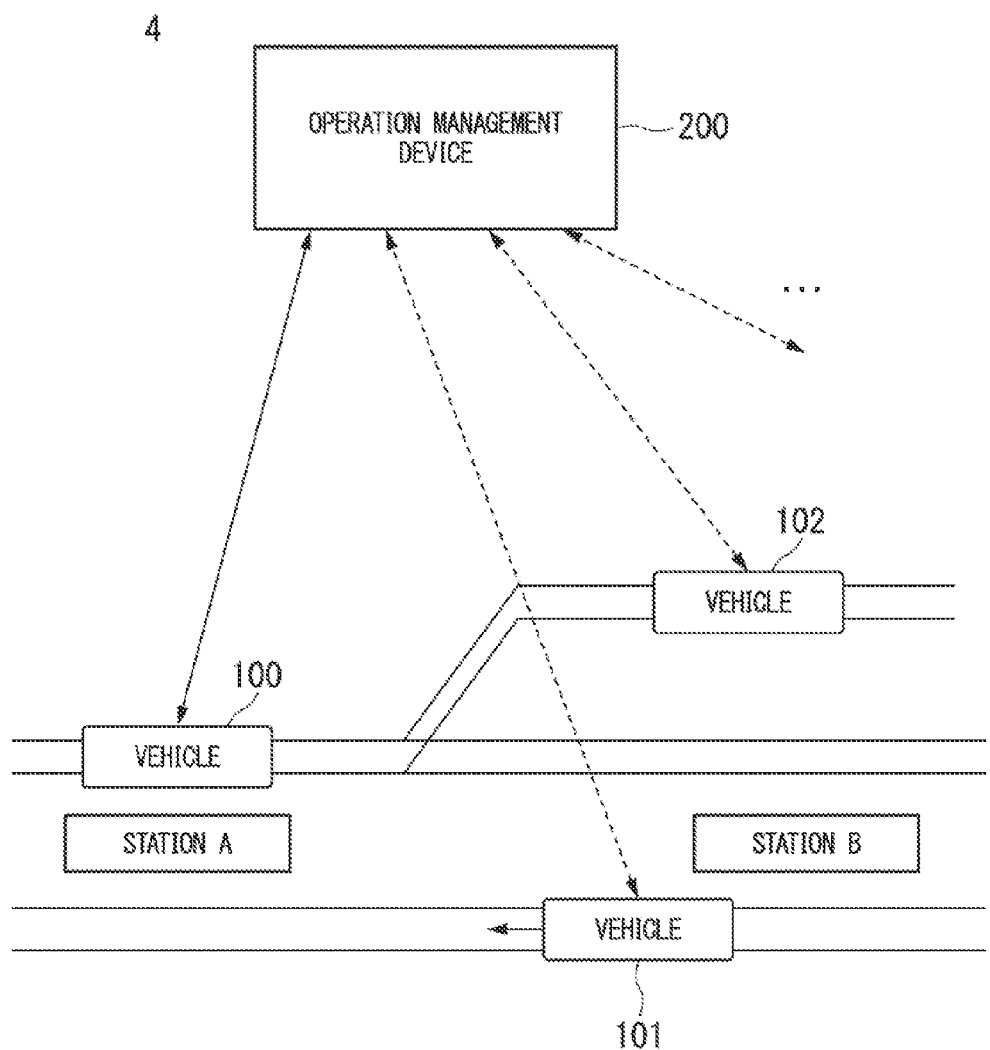
FIG. 8 is a diagram illustrating a functional configuration of a vehicle traffic system according to a second embodiment of the present invention.

FIG. 8 is a diagram illustrating a functional configuration of the vehicle traffic system according to the second embodiment. In FIG. 8, the vehicle traffic system 4 is illustrated.

The vehicle traffic system 4 includes a plurality of vehicles 10n (100, 101, 102, . . . ) having the charging and discharging control device 1 according to the first embodiment and an operation management device 200 for managing operations of all of the plurality of vehicles 10n by instructing each of the plurality of vehicles 10n to perform power running and braking. Here, the operation management device 200 can find an operation situation (power running, braking, or the like) and a position of each vehicle 10n through a predetermined communication network and transmit various commands to each vehicle 10n depending on the situation. Also, in this embodiment, the communication network is not limited to a wireless or wired network and a type of communication scheme of the communication network is also not limited.

Then, the charging and discharging control device 1 provided in the vehicle 10n includes a change permission signal reception unit 14 configured to receive a charging/discharging characteristic change permission signal from the operation management device 200, and the charging and discharging control change unit 13 further mitigates the charging and discharging characteristics of the charging and discharging control unit 11 when the above-described charging/discharging characteristic change permission signal has been input. On the other hand, the operation management device 200 transmits the charging/discharging change permission signal to each of the plurality of vehicles 10n.

Thereby, the operation management device 200 can appropriately instruct to change the charging and discharging control characteristics in an individual vehicle 10n while finding a layout situation across all of the plurality of vehicles 10n. For example, when there is no other vehicle 10n capable of effectively performing power running around a certain vehicle 100 which is stopped, it is not necessary to mitigate the charging and discharging control characteristics in the vehicle 100. That is, the operation management device 200 can determine whether it is necessary to sequentially mitigate the charging and discharging control characteristics in the individual vehicles 10n and perform control for mitigating the charging and discharging control characteristics only when the high assistance effect can be expected.

Here, for example, the operation management device 200 uses a technique of constantly monitoring position information of each vehicle through a wired or wireless communication means separately used by the operation management device 200 as means for determining "whether there is another vehicle 10n capable of effectively performing power running assistance." Then, the operation management device 200 includes a determination means for determining whether there is another vehicle in a predetermined range in which the power running assistance is assumed to be effectively performed around the vehicle (vehicle 100) that transmits a power running instruction using the position information of each vehicle.

Figure 9:
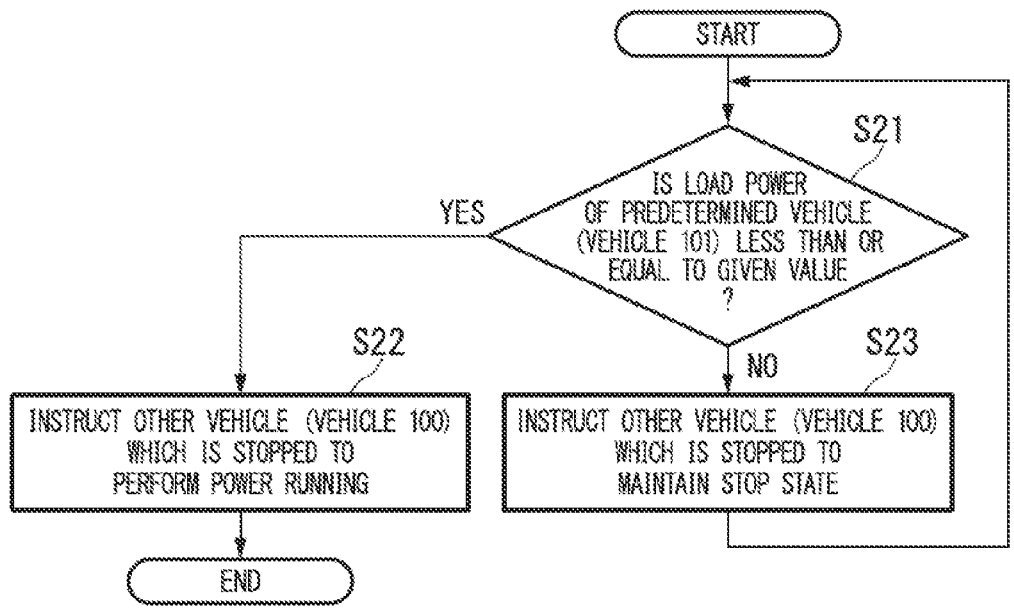
FIG. 9 is a diagram illustrating a processing flow of an operation management device according to the second embodiment of the present invention.

FIG. 9 is a diagram illustrating a processing flow of the operation management device according to the second embodiment of the present invention.

Here, the vehicle traffic system 4 according to this embodiment may further include the following function. For example, the operation management device 200 separately detects a determination state in the load determination unit 12 provided in each of the plurality of vehicles 10n. Then, when the absolute value of the load power of a first vehicle which is one of the plurality of vehicles 10n (for example, the vehicle 100) is less than the predetermined load power threshold value, the operation management device 200 may instruct a second vehicle (for example, the vehicle 101) to perform power running or breaking.

Specifically, for example, the operation management device 200 performs a processing flow as illustrated in FIG. 9. That is, the operation management device 200 first determines whether the absolute value of the load power in a predetermined vehicle (for example, the vehicle 101 of FIG. 8) is less than the predetermined load power threshold value (step S21). Here, the operation management device 200 according to this embodiment may have an aspect in which it is merely detected whether the vehicle 101 is in a state in which the absolute value of the load power increases, that is, whether the vehicle 101 is performing power running or braking without directly detecting the absolute value of the load power in the vehicle 101. In this case, the operation management device 200 determines that the absolute value of the load power in the vehicle 101 is greater than or equal to the load power threshold value when it is detected that the vehicle 101 is performing power running or braking. In addition, when it is detected that the vehicle 101 is stopped or coasting, the operation management device 200 determines that the absolute value of the load power in the vehicle 101 is less than the load power threshold value.

Next, when the absolute value of the load power in the vehicle 101 is less than the predetermined load power threshold value in step S21, the operation management device 200 issues an instruction for power running of another vehicle (for example, the vehicle 100 of FIG. 8) which is stopped (step S22). On the other hand, when the absolute value of the load power in the vehicle 100 is greater than or equal to the predetermined load power threshold value, the operation management device 200 transmits an instruction for maintaining the stop state to the vehicle 100 (step S23) and returns to a process (step S21) of determining whether the absolute value of the load power in the vehicle 100 is less than the load power threshold value.

That is, when the vehicle 101 is performing power running and the vehicle 101 does not perform power running assistance for another vehicle 100 which is stopped, the operation management device 200 causes the other vehicle to remain stopped without issuing an instruction for power running of the other vehicle which is stopped (step S23). Then, after detecting that the vehicle 101 has ended power running to enter a coasting state and can assist with the power running of the other vehicle 100, the operation management device 200 transmits a power running instruction to the vehicle 100. Thereby, the operation management device 200 can intentionally avoid a situation, in which vehicles cannot assist the power running each other since timings of the power running of the vehicles overlap, by performing operation control in linkage with a state of each vehicle. That is, assuming that consumption power necessary in the power running time in a certain vehicle is assisted by the power storage device of another vehicle, power storage capacity to be mounted on each of the vehicle can also be reduced.

In addition, when the vehicle 101 in which the absolute value of the load power is less than the predetermined load power threshold value is in a predetermined power transmission available range from the above-described other vehicle (vehicle 100), the operation management device 200 may further instruct the vehicle 100 to perform power running or braking. That is, in the above-described case, resistance loss of an overhead wire is too large when a distance between the vehicle 100 and the vehicle 101 is too large and it is difficult for the vehicle 101 to effectively perform power running assistance for the vehicle 100 even when the absolute value of the load power is less than the predetermined load power threshold value. Accordingly, the operation management device 200 performs operation control capable of reliably performing power assistance from a vehicle in the "predetermined power transmission available range" in which an effective assistance effect can be expected while finding current positions of all vehicles 10n. Here, the "predetermined power transmission available range" is a distance obtained in advance in consideration of output power of each power storage device 3 mounted on the vehicle 10n and overhead wire resistance and is a distance at which an effect of reducing the peak value and the effective value of the charging/discharging current in the power storage device 3 can be substantially expected.

Also, the operation management device 200 according to this embodiment may have the following means as a specific means for "detecting whether the certain vehicle 10n is performing power running or braking" as described above. That is, the operation management device 200 has means for detecting a signal which indicates whether the vehicle 10n has passed through a predetermined position. Then, the operation management device 200 may determine that the vehicle 10n has been transitioned from the power running state to the coasting state or transitioned from the coasting state to the braking state from the fact that the target vehicle 10n has passed through the corresponding position.

In addition, the vehicle traffic system 4 according to this embodiment may be characterized in that the charging and discharging control device 1 is stopped regularly in an operable state in at least one of the plurality of vehicles 10n. For example, in FIG. 8, it is assumed that the vehicles 100 and 101 are vehicles related to an operation and the vehicle 102 is in the stationary state on a route which is not related to the operation (for example, a state in which the vehicle 102 is stored in the garage). That is, the operation management device 200 according to this embodiment is designed so that at least one vehicle on the route which is not related to the operation and a vehicle 10n in the stationary state are disposed in the operation of each vehicle 10n. In this manner, if the vehicle 102 is constantly in the "stationary" state, it is possible to obtain power assistance from at least the vehicle 102 even when the vehicles 100 and 101 related to the operation are in any state. Accordingly, the vehicle traffic system 4 can implement reliable power assistance between the vehicles 10n and more effectively reduce the peak value and the effective value of the charging/discharging current in the power storage device 3.

In addition, there may be a vehicle in which an operation is disabled due to some trouble in an operation process or a vehicle which is not related to the operation as a result of turbulence occurring in an operation schedule. In the above-described aspect, further, the operation management device 200 may intentionally dispose the vehicle which is not related to the above-described operation on a route which is not related to the operation and handle the vehicle which is not related to the above-described operation equivalently with a vehicle in the above-described "stationary" state as an exclusive power assistance vehicle. Thereby, the power storage device mounted on the vehicle which is not unexpectedly related to an operation in an operation process can also be effectively utilized for exclusive power assistance.

Also, the above-described charging and discharging control device 1 internally has a computer system. Then, a process of the above-described processing in the above-described charging and discharging control device 1 may be stored in a computer-readable recording medium in the form of a program. The above-described process may be performed when a computer reads and executes the program. Here, the computer-readable recording medium may be a magnetic disk, a magneto-optical disc, a compact disc read-only memory (CD-ROM), a digital versatile disc-read only memory (DVD-ROM), a semiconductor memory, or the like. In addition, the computer program may be distributed to the computer through a communication line, and the computer receiving the distributed program may execute the program.

INDUSTRIAL APPLICABILITY

According to the present invention, an effect of reducing a peak value or an effective value of a charging/discharging current in a power storage device mounted on a vehicle and reducing cost of the power storage device is obtained.

REFERENCE SIGNS LIST

1 Charging and discharging control device
10 Pantograph point voltage detection unit
11 Charging and discharging control unit
12 Load determination unit
13 Charging and discharging control change unit
14 Change permission signal reception unit
2 Load
3 Power storage device
4 Vehicle traffic system
100 Vehicle
200 Operation management device

The invention claimed is:

1. A charging and discharging control device comprising:
    a pantograph point voltage detection unit configured to detect a pantograph point voltage of a vehicle which performs power running and braking based on power exchange with an overhead wire;
    a charging and discharging control unit configured to charge a power storage device provided in the vehicle when the pantograph point voltage is greater than or equal to a predetermined charging voltage threshold value and discharge the power storage device when the pantograph point voltage is less than a predetermined discharging voltage threshold value;
    a load determination unit configured to determine whether an absolute value of load power for the vehicle is less than a predetermined load power threshold value; and
    a charging and discharging control change unit configured to reduce any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the vehicle is less than the predetermined load power threshold value is satisfied.

2. The charging and discharging control device according to claim 1, wherein the charging and discharging control change unit performs mitigation to reduce a difference between the charging voltage threshold value and the discharging voltage threshold value when the absolute value of load power of the vehicle is less than the predetermined load power threshold value.

3. The charging and discharging control device according to claim 1,
    wherein the load determination unit stores a plurality of predetermined load power threshold values, and
    wherein the charging and discharging control change unit changes a mitigation degree of at least one of the charging voltage threshold value, the discharging voltage threshold value, and the charging/discharging impedance, depending on the absolute value of the load power being less than one of the plurality of load power threshold values.

4. The charging and discharging control device according to claim 1, further comprising:
    a change permission signal reception unit configured to receive a charging/discharging characteristic change permission signal from an external device,
    wherein the charging and discharging control change unit reduces any one or more of the charging voltage threshold value, the discharging voltage threshold value, and the charging/discharging impedance when the condition that the change permission signal reception unit has input the charging/discharging characteristic change permission signal is further satisfied.

5. A vehicle traffic system comprising:
a plurality of vehicles configured to perform power running and braking based on power exchange with an overhead wire; and
an operation management device configured to manage operations of all the plurality of vehicles by instructing each of the plurality of vehicles to perform the power running and the braking,
wherein each of the plurality of vehicles includes a charging and discharging control device having
a pantograph point voltage detection unit configured to detect a pantograph point voltage of an own vehicle;
a charging and discharging control unit configured to charge a power storage device provided in the own vehicle when the pantograph point voltage is greater than or equal to a predetermined charging voltage threshold value and discharge the power storage device when the pantograph point voltage is less than a predetermined discharging voltage threshold value;
a load determination unit configured to determine whether an absolute value of load power for the own vehicle is less than a predetermined load power threshold value; and
a charging and discharging control change unit configured to reduce any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the own vehicle is less than the predetermined load power threshold value is satisfied.

6. The vehicle traffic system according to claim 5,
wherein the charging and discharging control device provided in each of the plurality of vehicles includes a change permission signal reception unit configured to receive a charging/discharging characteristic change permission signal from the operation management device,
wherein the charging and discharging control change unit reduces any one or more of the charging voltage threshold value, the discharging voltage threshold value, and charging/discharging impedance indicating an increase/decrease amount of a charging/discharging current depending on the increase/decrease amount of the pantograph point voltage when the condition that the charging/discharging characteristic change permission signal has been input is further satisfied, and
wherein the operation management device transmits the charging/discharging characteristic change permission signal to each of the plurality of vehicles.

7. The vehicle traffic system according to claim 5, wherein at least one of the plurality of vehicles is stopped temporarily or regularly in a state in which the charging and discharging control device is operable.

8. The vehicle traffic system according to claim 5,
wherein the operation management device separately detects a determination state in the load determination unit provided in the plurality of vehicles, and wherein, when the absolute value of the load power of the vehicle is less than a predetermined load power threshold value in a first vehicle which is at least one of the plurality of vehicles, the operation management device instructs a second vehicle to perform the power running or braking.

9. The vehicle traffic system according to claim 8, wherein the operation management device further instructs the second vehicle to perform the power running or braking when the vehicle in which the absolute value of the load power is less than a predetermined load power threshold value is in a predetermined power transmission available range from the second vehicle.

10. A charging and discharging control method comprising:
detecting a pantograph point voltage of a vehicle which performs power running and braking based on power exchange with an overhead wire;
charging a power storage device provided in the vehicle when the pantograph point voltage is greater than or equal to a predetermined charging voltage threshold value;
discharging the power storage device when the pantograph point voltage is less than a predetermined discharging voltage threshold value;
determining whether an absolute value of load power for the vehicle is less than a predetermined load power threshold value; and
reducing any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the vehicle is less than the predetermined load power threshold value is satisfied.

11. A non-transitory computer readable medium having recorded thereon, a computer program for causing a computer of a charging and discharging control device, which includes a pantograph point voltage detection unit configured to detect a pantograph point voltage of a vehicle which performs power running and braking based on power exchange with an overhead wire and a charging and discharging control unit configured to charge a power storage device provided in the vehicle when the pantograph point voltage is greater than or equal to a predetermined charging voltage threshold value and discharge the power storage device when the pantograph point voltage is less than a predetermined discharging voltage threshold value, to function as:
a load determination means configured to determine whether an absolute value of load power for the vehicle is less than a predetermined load power threshold value; and
a charging and discharging control change means configured to reduce any one or more of the charging voltage threshold value, the discharging voltage threshold value, and charging/discharging impedance indicating an increase/decrease amount of a charging/discharging current depending on an increase/decrease amount of the pantograph point voltage when the condition that the absolute value of the load power of the vehicle is less than the predetermined load power threshold value is satisfied.

* * * * *